United States Patent Office 3,424,618
Patented Jan. 28, 1969

3,424,618
PROCESS FOR THE FORMING OF SEALED ALKALINE SINTERED ELECTRODE ACCUMULATORS HAVING A LOW SELF-DISCHARGE
Karl Weilnböck, Erlau uber Passau, Germany, assignor to Societe des Accumulators Fixes et de Traction (Societe Anonyme), Romainville, Seine-St. Denis, France, a company of France
No Drawing. Continuation of application Ser. No. 332,273, Dec. 20, 1963. This application Dec. 27, 1967, Ser. No. 694,016
Claims priority, application Germany, Dec. 21, 1962, V 23,447
U.S. Cl. 136—6      4 Claims
Int. Cl. H01m 45/04, 43/04

ABSTRACT OF THE DISCLOSURE

Process for providing low self-discharge and effective charge preservation in alkaline storage cells of the sintered foil electrode-separator pack type with the electrolyte retained primarily in the pack comprising adding the electrolyte, then subjecting the assembled cell in open state to a long lasting charge of from 20 to 30 hours at high current corresponding in value in amperes from one to two times the rated capacity in ah. of the cells uninterrupted by any discharge and during the uninterrupted long lasting charge removing and replacing the electrolyte from two to four times, thereafter discharging the cell for a short period of time at approximately the same charging current value, replacing the electrolyte, subsequently further charging the cell at said same current value for about 1¼ hours and adjusting the electrolyte so that the electrode separator pack will contain from 30–40% by volume of the electrolyte and thereafter sealing the cell.

RELATED APPLICATIONS

This application is a continuation of my earlier application Ser. No. 332,273 filed Dec. 20, 1963 (now abandoned).

BRIEF SUMMARY OF INVENTION

This invention relates to a process for forming of sealed alkaline sintered electrode accumulators (storage cells or batteries) having a low self-discharge.

The accepted meaning of the term "self-discharge" of accumulators denotes a lowering in capacity and voltage, beginning with the termination of the charging operation, although the external circuit is not closed. Quite apart from the abnormal self-discharge caused by sneak currents resulting, for instance, from improper maintenance (electrolyte bridges on the cells, batteries or insulators), the charge also can be reduced by impurities in the electrolyte or the electrodes. However, even if the electrolyte and the electrodes are in perfect condition and sneak currents are eliminated, this disadvantageous self-discharge property of accumulators is unavoidable in view of the instability of the reduction-oxidation (Redox) systems required in the case of reversible current sources, i.e., in particular the instability of the positive, electrochemical materials in their anodically oxidized valence form in the charged state. According to the present state of knowledge, during the charging of alkaline accumulators of the nickel-cadmium (Ni–Cd) category partially metastable $NiO_2 \cdot H_2O$ with tetravalent nickel forms. Because of the presence of existing, uncharged $Ni(OH)_2$ the partially metastable product including tetravalent nickel decomposes, as is known, to a β-NiOOH compound which reduces furthermore with nickel (II) hydroxide to $Ni_3O_2(OH)_4$, thus providing the main cause of self-discharge in Ni–Cd accumulators.

Alkaline accumulators with sintered support electrodes, particularly foil-type sintered support electrodes, especially designed for operation as sealed cells, wherein the electrolyte is primarily located only within the electrode separator pack, have this drawback, side by side with their significant advantageous properties, to such an extent that the practical utility of such cells is frequently placed in doubt. Thus, in the charged state, such accumulators show, for example in a month of, idling, charge losses of up to 50% and more, compared to 24% in the case of Ni–Cd accumulators provided with pocket-type electrodes and free electrolyte in unsealed cells. It is understandable in view of the fact that the disassociation of the charged positive materials is considerably promoted in the case of electrolyte-wetted large-area sintered support foils. To this fact it must be added, further, that, with hitherto known forming processes, the maximum possible oxidation stage is achieved to a small extent only, i.e., by repeated charging and discharging with a current corresponding value to ⅒ to ⅕ of the rated cell capacity in ampere hours (ah.).

Principal objects and features of this invention are the avoidance or elimination of self-discharge of sealed alkaline accumulators with sintered electrodes, and more particularly thin or foil-type sintered electrodes.

Upon thorough consideration of these hitherto known causes of the self-discharge of such accumulators it has now been found that this disadvantage can with certainty be avoided by charging such accumulators for a very long period of time or duration with an extremely high current, preferably for 20 to 30 hours with a charging current corresponding in value to one to two times the rated cell capacity in ah. This unusual treatment achieves an optimum degree of oxidizability and lastingly counteracts the causes of self-discharge indicated above.

Of course, during the application of heavy current in the case of maintenance free or sealed accumulators of the type in question, care must be taken not to disturb their conventional properties which are governed by the amount, concentration and distribution of electrolyte with regard, for example, to internal resistance and the gassing mechanics thereof. Accordingly, during the forming, the electrolyte is repeatedly replenished with fresh electrolyte by means of a "vacuum rinse." After termination of the charge, one temporarily discharges by tapping off current at the rated capacity of the accumulator and fills the cell with electrolyte under a vacuum, after which the electrolyte volume is by charging and controlled overcharging regulated in such a way that about 35 percent by volume of the overall volume of the electrode-separator pack are uniformly filled with electrolyte. This electrolyte replacement and filling process during the forming simultaneously eliminates possible impurities of the electrodes likely to have a disadvantageous influence on the preservation of the charge. Accumulators of the type under consideration treated in this manner show, for instance, after an idling period of one month at room temperature a charge loss of not more than 15%. Endurance tests thereof during a period of 1½ years indicate self-discharge values of less than 50%, values that could hitherto be achieved only with open cells provided with pocket or molded on tubular electrodes of the Edison type and filled with free electrolyte. This improvement in the preservation of the charge is noted independently of the method of introduction of the hydroxides.

It was furthermore found that through the described forming method and beyond the improvement in the preservation of the charge, the capacity values or ratings of such accumulators at different loads no longer show differences as great as those noted in accumulators formed according to the hitherto known methods. In addition, at the same time, the discharge characteristics of accumulators formed according to this invention are improved with respect to their constant voltage values.

Further advantages of the process according to the invention are:

(1) Lowering of the internal resistance of such accumulators;
(2) Improvement of the reduced-period discharge ability;
(3) Improvement of the mean discharge voltage at high load; and
(4) Improvement of the gas regeneration.

EXAMPLE

Ni–Cd accumulators of the type under consideration in the open state and having very closely-spaced thin sintered support electrode and separator packs and a rated capacity of 250 mah. are filled under a vacuum with 23 percent by weight KOH and charged at 300 ma. for 24 hours. During this period, the process is interrupted after each five or ten hours of charging in order to rinse the cells in the charged state and fill them with fresh electrolyte. After termination of the charging period, the so-treated accumulators are discharged for one hour at 300 ma. (the one hour rate 1C for accumulators of the size under treatment in this example), the KOH electrolyte is replaced and replenished under vacuum, and on further 1¼ hours of charging at 300 ma. the amount of electrolyte is so proportioned or regulated that 1 cc. of the electrode separator pack will contain from 30 to 40 percent and preferably about 35 percent by volume of electrolyte. The filling or the removal of the electrolyte during the charging is made through an opening which, after the termination of the forming, is closed as by a valve.

Naturally, accumulators, cells or batteries treated according to this invention can be sealed in conventional ways known in the art, see, for example, U.S. Patents Nos. 2,928,888, 3,059,041, 3,108,909 after termination of the forming described for subsequent self-discharge tests during idling periods over the periods mentioned previously in this specification and/or for commercial production.

Although a specific embodiment of the invention has been disclosed, variations within the scope of the appended claims are possible and are contemplated. There is no intention of limitation to the exact disclosure herein made.

What is claimed is:

1. Process for forming electrodes in an assembled alkaline storage cell containing a sintered foil electrode-separator pack within which alkaline electroltye is retained primarily in the pack for achieving useful values of charge preservation and consequently low self-discharge comprising the steps of incorporating electrolyte into the assembled cell and then subjecting such an assembled cell in open state to continuous long-lasting charging of from 20 to 30 hours at a high current corresponding in value expressed in amperes to from one to two times the rated capacity in ah. of the cell and during such charging uninterrupted by any discharge, removing and replacing the electrolyte under vacuum in the assembled cell after each five or ten hours of said charging period of 20 to 30 hours and thereafter closing said cell.

2. A process for forming electrodes in an assembled Ni–Cd type alkaline storage cell containing a sintered foil electrode-separator pack within which alkaline electrolyte is primarily retained in the pack for achieving useful values of charge preservation and consequently low self discharge comprising the steps of incorporating electrolyte into the cell and continuously charging such an assembled cell in open state for a long period of from twenty to thirty hours and at a high current whose value expressed in amperes is from once to twice the rated capacity in ampere hours of the cell and during said charging uninterrupted by any discharge removing and replacing the electrolyte under vacuum after each five or ten hours of said charging period of twenty to thirty hours and thereafter closing said cell.

3. The process of claim 2 including the step at the end of long charge of again replacing of the electrolyte under vacuum so that the amount thereof is so proportioned and regulated that the electrode-separator pack will contain from 30 to 40 percent by volume of electrolyte.

4. A process for forming electrodes in an assembled alkaline storage cell containing a sintered support foil electrode-separator pack in which alkaline electrolyte is retained primarily in the pack for achieving useful values of charge preservation and consequently low self discharge comprising the steps of subjecting such a cell in open state to a lengthy continuous charging lasting from 20 to 30 hours at a high current whose value expressed in amperes is from once to twice the rated capacity in ampere hours of the cell, and during such charging uninterrupted by any discharge rinsing the cell and replacing the electrolyte under vacuum therein after each five or ten hours of said charging period of 20–30 hours, thereafter discharging the cell for approximately one hour at approximately the same current value as of said charging and replacing the electrolyte under vacuum and by subsequently further charging the cell at the same current value for a period of about 1¼ hours and adjusting the electrolyte under vacuum so that the electrode separator pack will contain from 30–40% by volume of electrolyte and subsequently sealing the cell.

References Cited

UNITED STATES PATENTS

| 2,382,675 | 8/1945 | Sutherland et al. | |
|---|---|---|---|
| 2,602,826 | 7/1952 | Stumbock | 136—34 |
| 2,658,097 | 11/1953 | Orsino | 136—76 X |
| 2,850,555 | 9/1958 | Pucher et al. | 136—34 X |
| 3,031,517 | 4/1962 | Peters | 136—76 X |
| 3,174,879 | 3/1965 | Stanimirovitch | 136—6 |

WINSTON A. DOUGLAS, *Primary Examiner.*

A. SKAPARS, *Assistant Examiner.*

U.S. Cl. X.R.

136—76